United States Patent
Ranger

(10) Patent No.: US 7,431,150 B2
(45) Date of Patent: Oct. 7, 2008

(54) ADJUSTABLE CURVED GUIDEWAY FOR A CONVEYOR AND METHOD FOR REALISING SAME

(75) Inventor: Michel Ranger, Lachine (CA)

(73) Assignee: Sidel (Canada) Inc., Laval, Quebec (CA)

(\*) Notice: Subject to any disclaimer, the term of this patent is extended or adjusted under 35 U.S.C. 154(b) by 0 days.

(21) Appl. No.: 10/545,870

(22) PCT Filed: Feb. 18, 2004

(86) PCT No.: PCT/CA2004/000227

§ 371 (c)(1),
(2), (4) Date: Aug. 17, 2005

(87) PCT Pub. No.: WO2004/074142

PCT Pub. Date: Sep. 2, 2004

(65) Prior Publication Data

US 2006/0144677 A1    Jul. 6, 2006

Related U.S. Application Data

(60) Provisional application No. 60/447,693, filed on Feb. 19, 2003.

(30) Foreign Application Priority Data

Feb. 18, 2003    (CA) .................................. 2419562

(51) Int. Cl.
*B65G 21/20*    (2006.01)
*B65G 51/03*    (2006.01)
*B65G 51/00*    (2006.01)

(52) U.S. Cl. ................. 198/836.3; 198/836.1; 198/839; 198/840; 198/795; 198/841

(58) Field of Classification Search ............. 198/836.1, 198/836.3, 840
See application file for complete search history.

(56) References Cited

U.S. PATENT DOCUMENTS

| | | | |
|---|---|---|---|
| 1,877,334 A | | 9/1932 | Lathrop et al. |
| 5,211,280 A | | 5/1993 | Houde |
| 5,291,988 A | | 3/1994 | Leonard |
| 5,718,030 A | * | 2/1998 | Langmack et al. ......... 29/426.3 |
| 6,050,396 A | | 4/2000 | Moore |
| 6,059,096 A | | 5/2000 | Gladieux |
| 2002/0146290 A1 | | 10/2002 | Arnold |
| 2003/0164280 A1 | * | 9/2003 | Delaporte et al. ......... 198/836.3 |

FOREIGN PATENT DOCUMENTS

| | | |
|---|---|---|
| EP | 1 215 146 A1 | 6/2002 |
| FR | 2 806 395 | 9/2001 |
| WO | WO 01/68491 A1 | 9/2001 |

\* cited by examiner

*Primary Examiner*—Gene O. Crawford
*Assistant Examiner*—Kavel P Singh
(74) *Attorney, Agent, or Firm*—Merchant & Gould P.C.

(57) ABSTRACT

An adjustable curved neck guide for a conveyor is disclosed. The guide comprises a plurality of segments mounted on first and second plates using a series of pin and slot assemblies. Each segment has first and second surfaces and a guide edge, the segments arranged end to end such that the guide edges define a curve having radius. As the second plate is moved relative to the first plate, the pins slide in the slots thereby moving the segments and changing the radius of curvature defined by the guide edges.

51 Claims, 16 Drawing Sheets

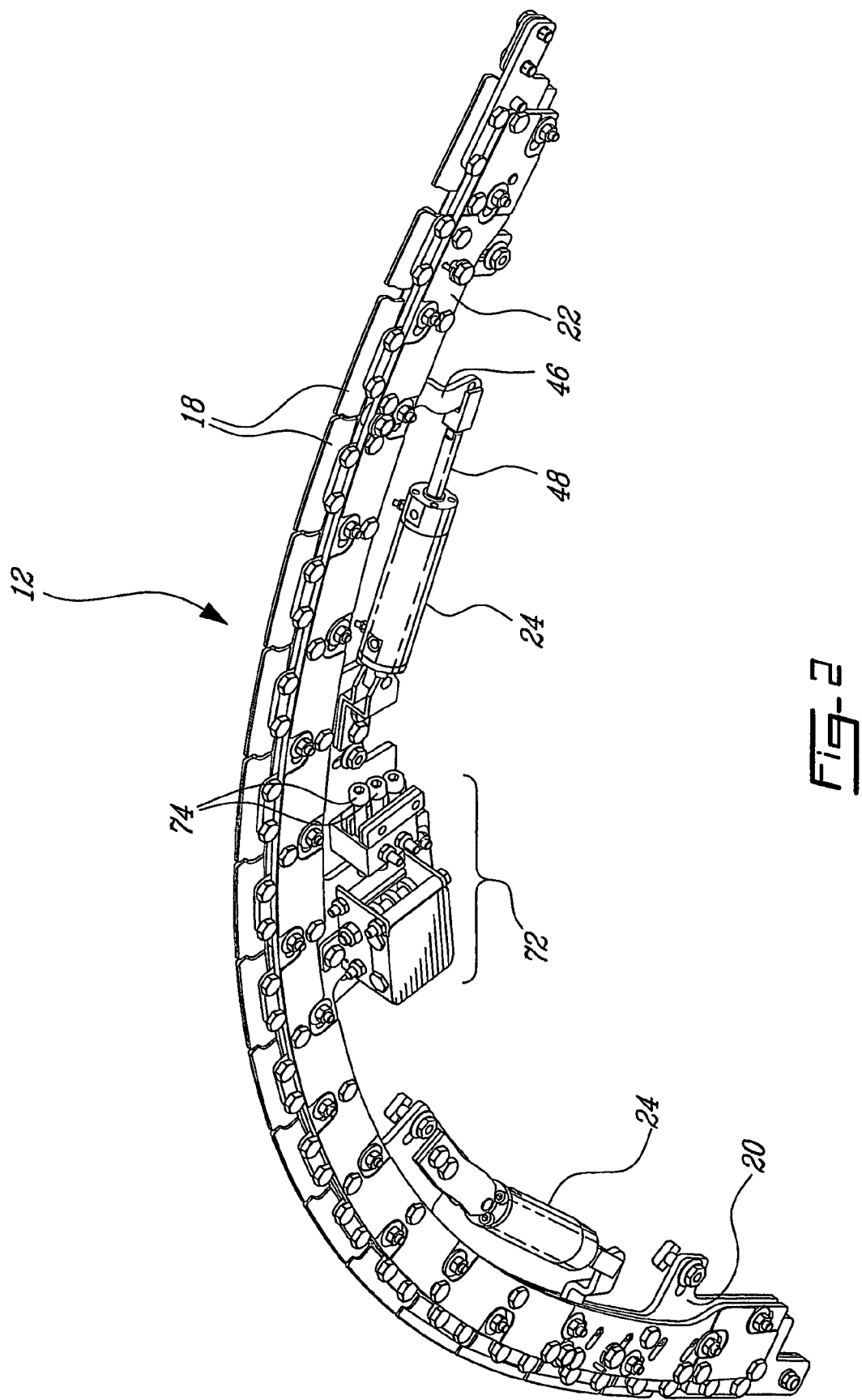

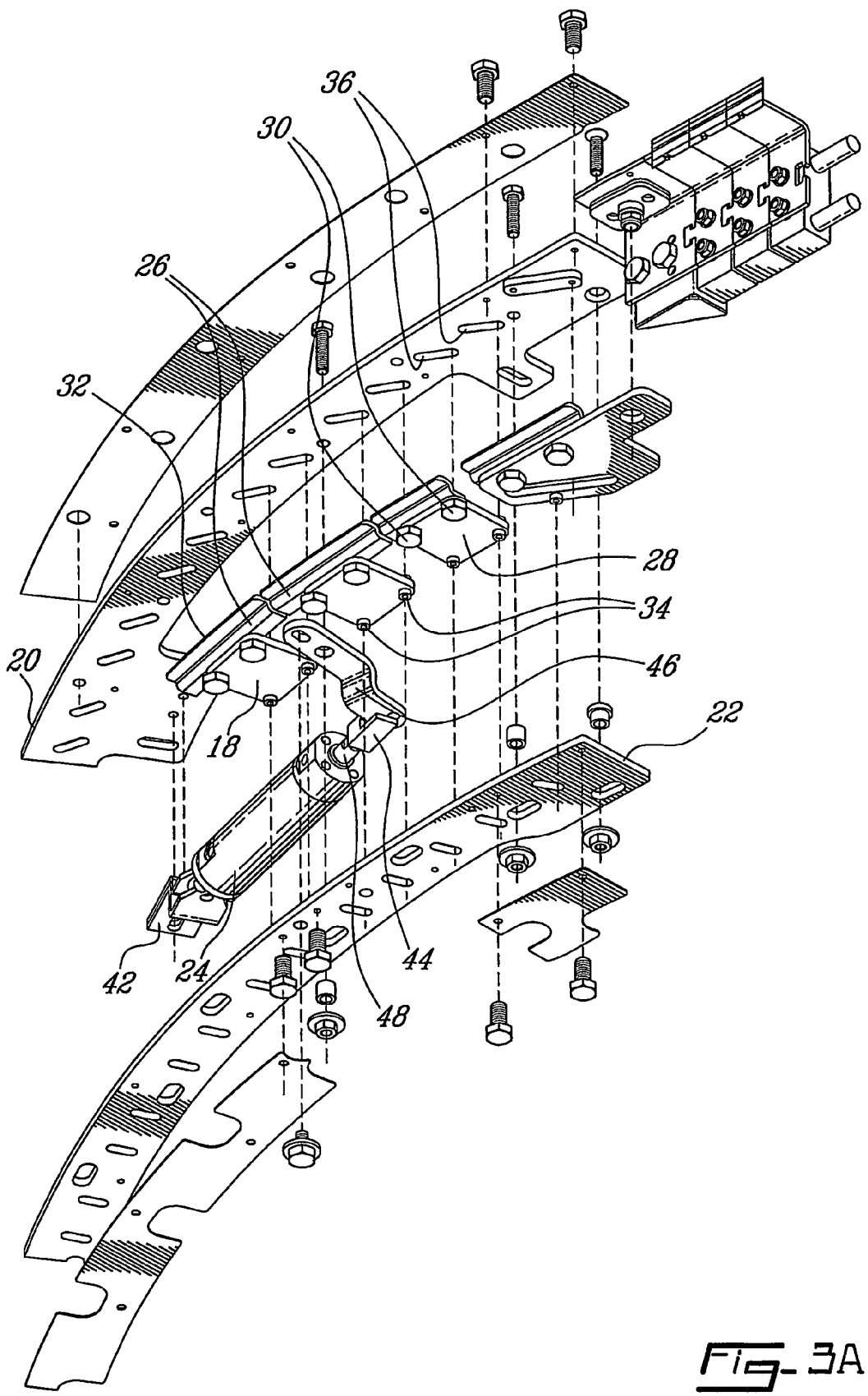
Fig_3A

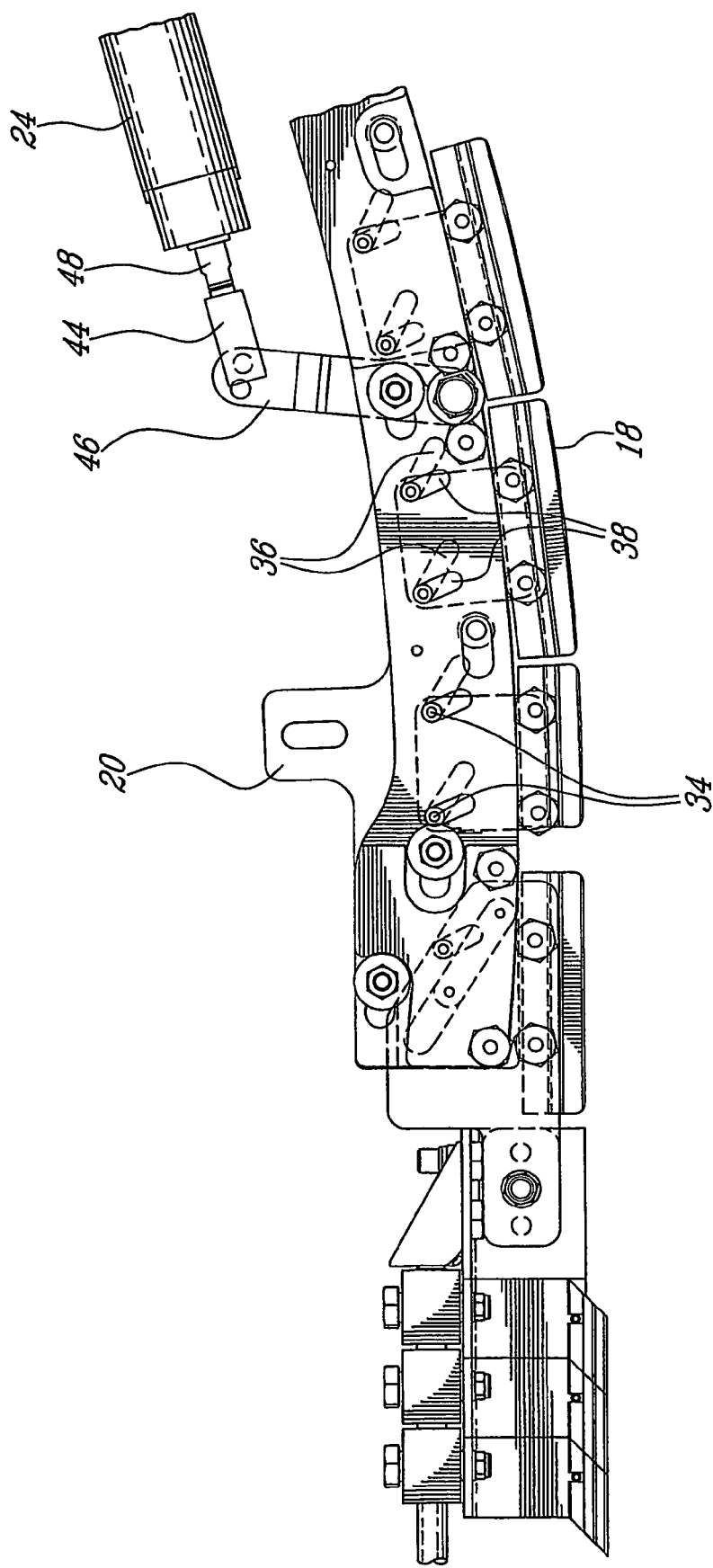

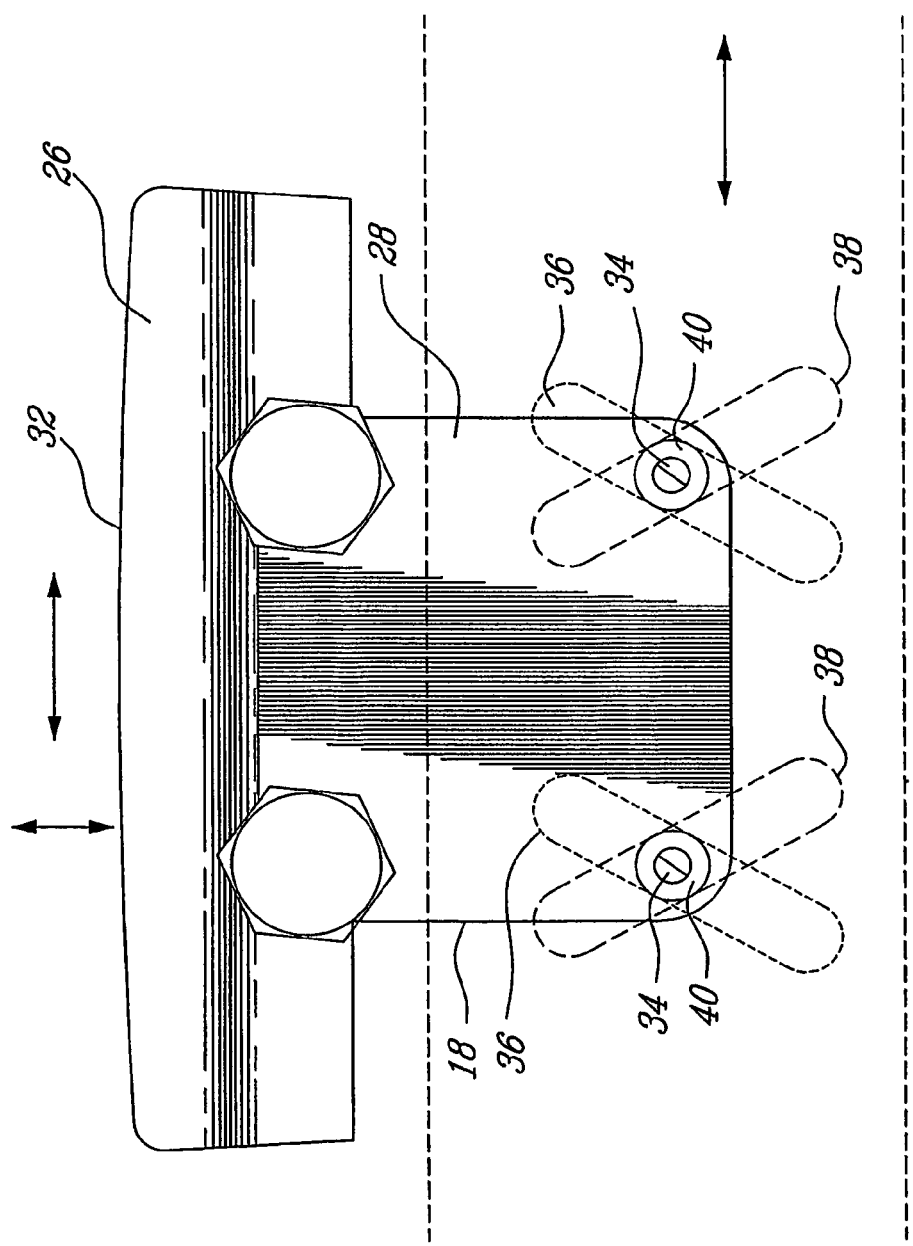

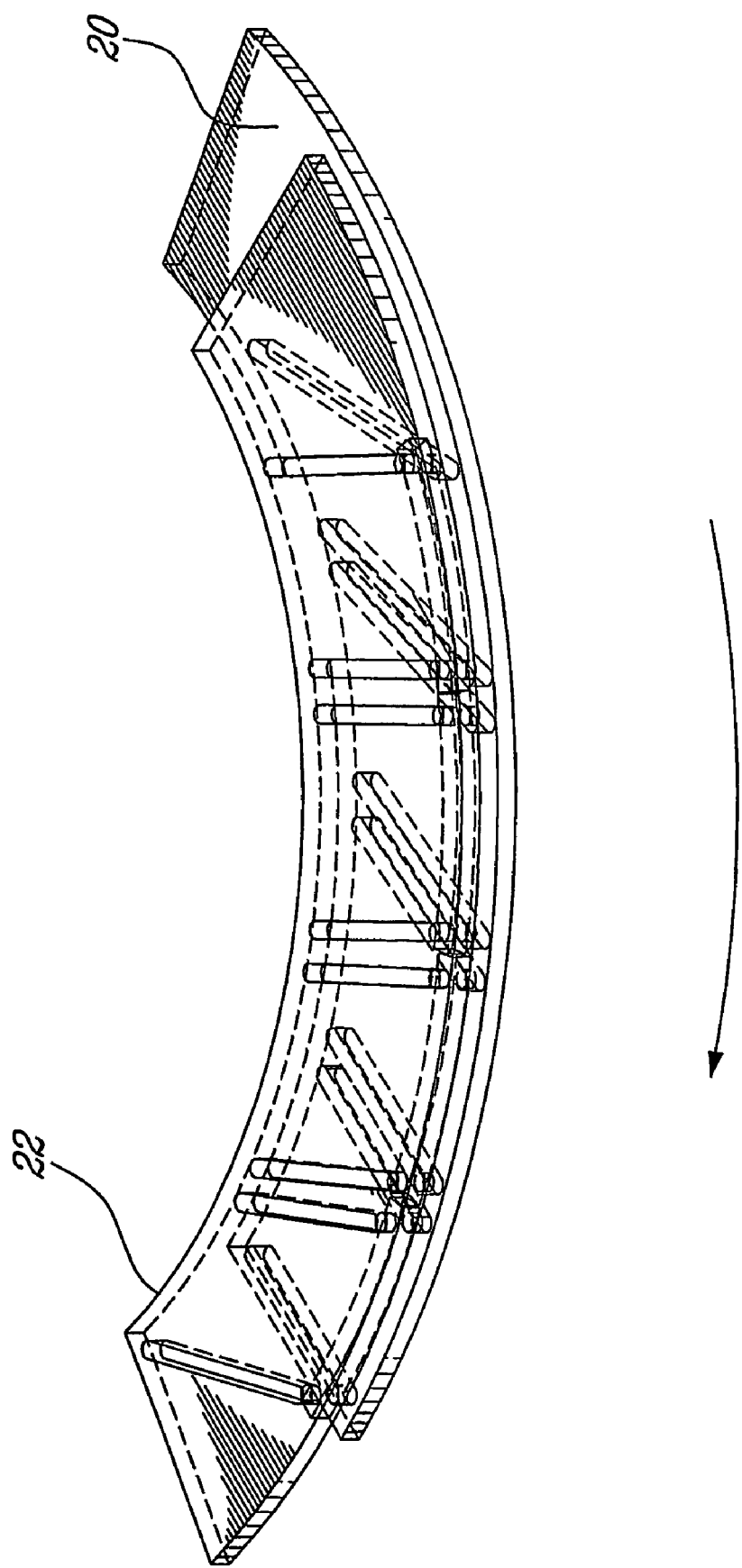

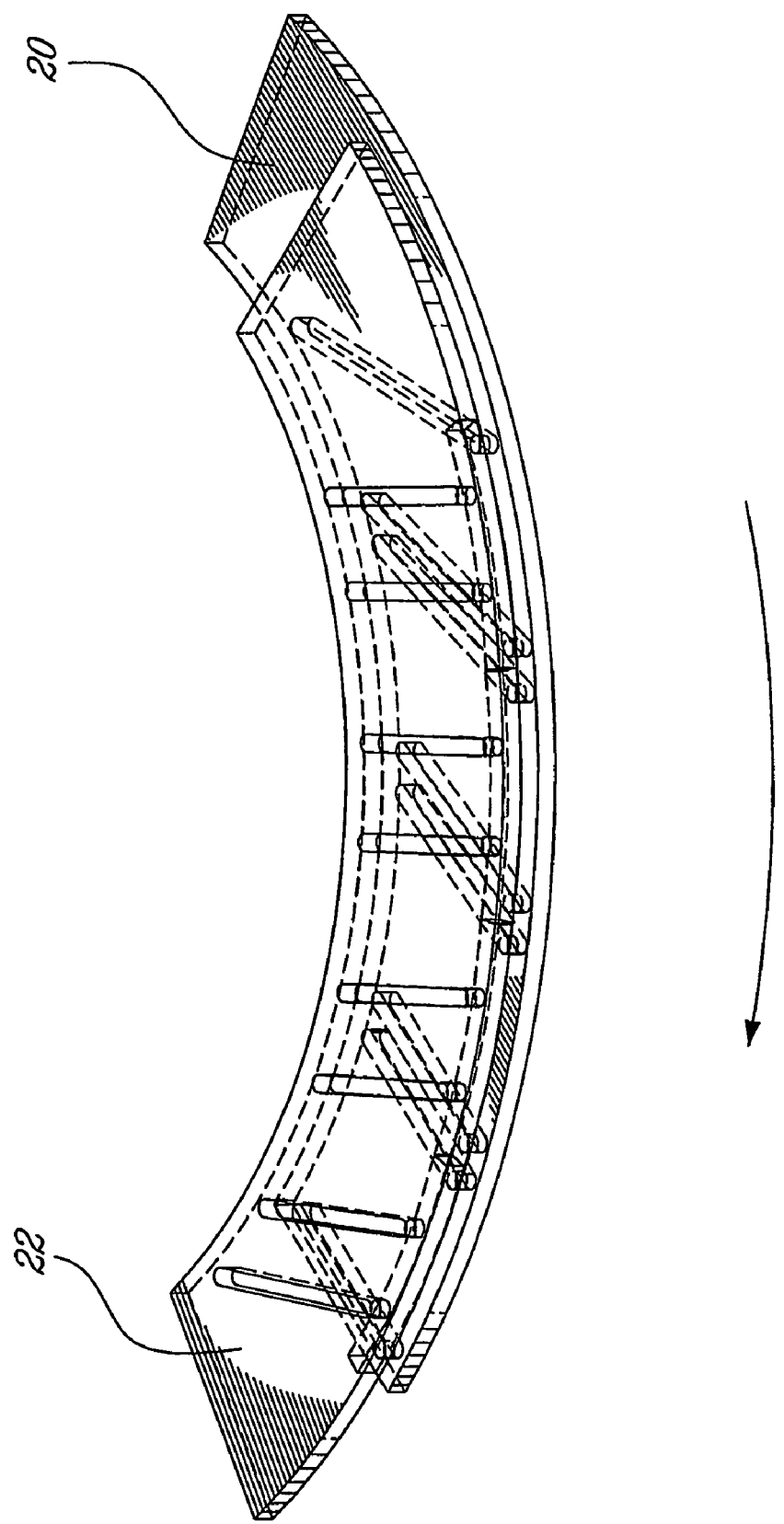

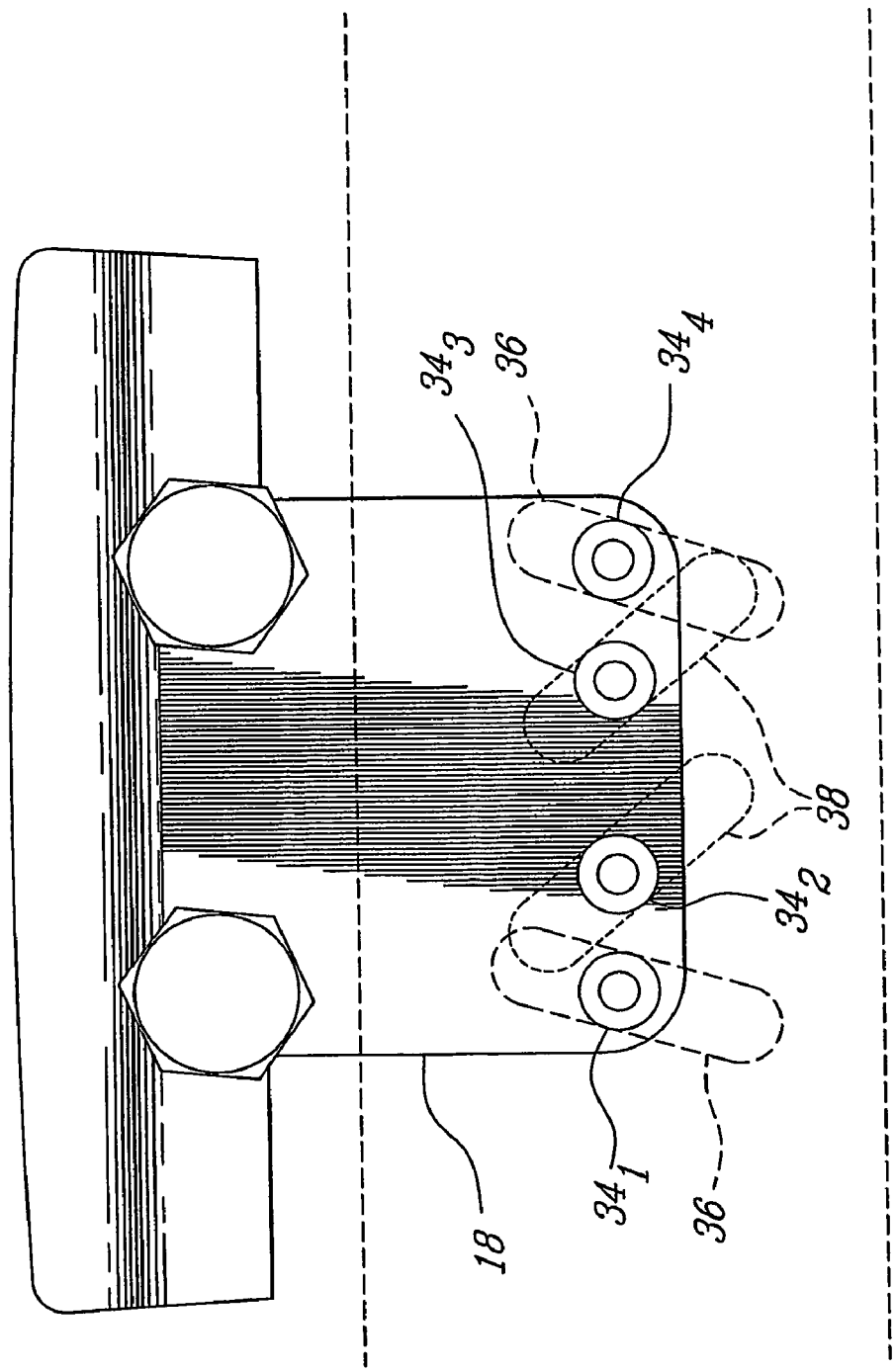

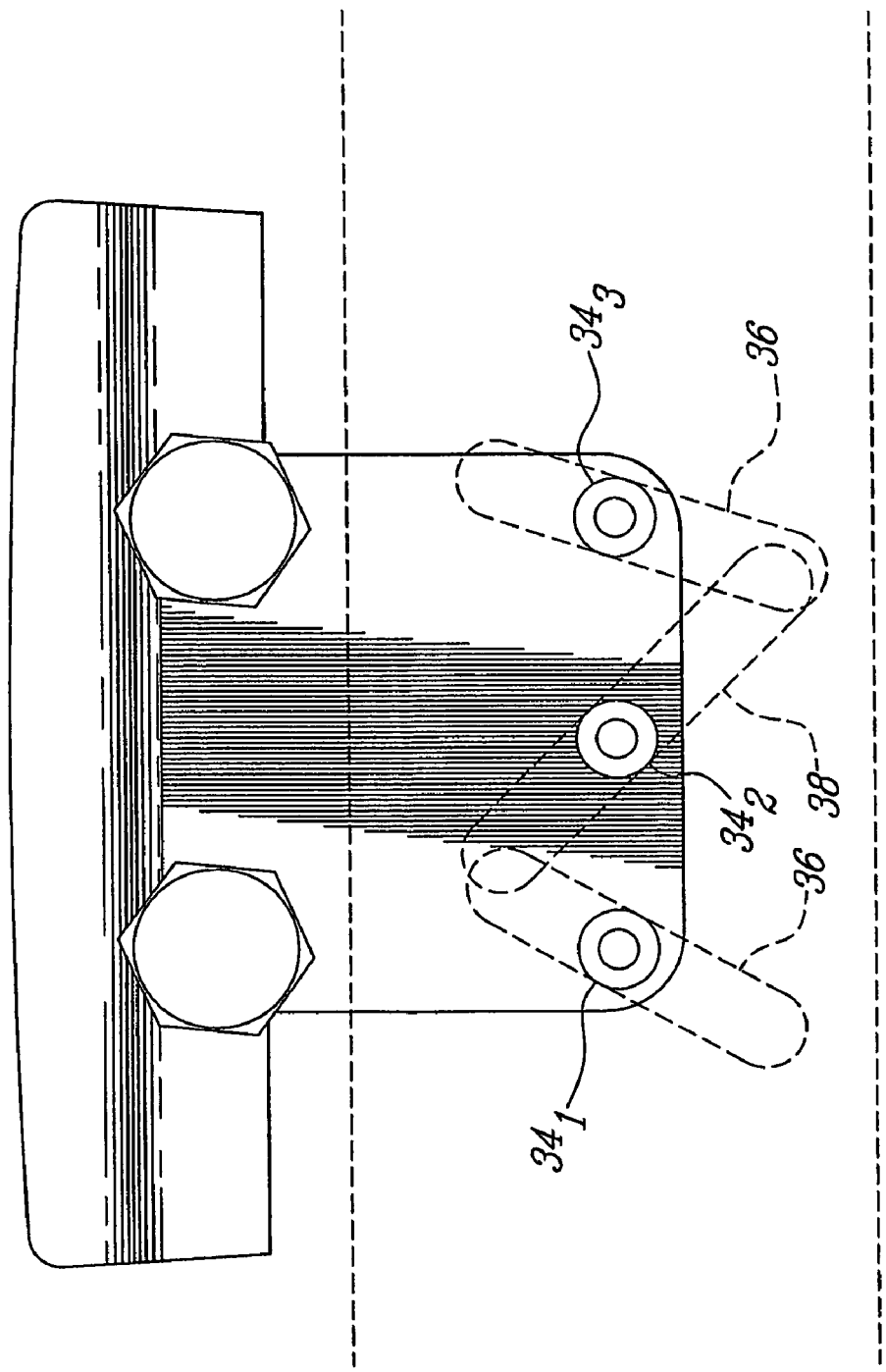

ADJUSTABLE CURVED GUIDEWAY FOR A CONVEYOR AND METHOD FOR REALISING SAME

CROSS REFERENCE TO RELATED APPLICATIONS

This application claims priority to PCT application No. CA2004/000227 filed on Feb. 18, 2004 and published in English under PCT Article 21(2); in U.S. provisional application No. 60/447,693 filed on Feb. 19, 2003; and in Canadian application no. 2,419,562 filed on Feb. 18, 2003. All documents above are herein incorporated by reference.

FIELD OF THE INVENTION

The present invention relates to an adjustable curved guide for a conveyor and a method for realising the same. In particular, the present invention relates to a curved guide wherein the distance between the guides can be adjusted by increasing or decreasing the radius of curvature of the guides.

BACKGROUND

Air conveyors are commonly used to convey empty plastic bottles. The bottles are supported by a ring flange located between the containers' shoulder and the threaded part of the container's neck. The flange rests on a pair of opposing guides which in turn define a guideway along which the bottle neck can move. Air is blown in the direction in which the bottles are to be conveyed, usually at the level of the neck, less commonly on the bottle's body. This type of conveyor eliminates the problems associated with container stability. Another advantage is the high speed at which the bottles may be conveyed.

Prior art air conveyor systems disclose rigid curve sections where the guides follow a smooth curve. One drawback of such prior art devices arises when bottles with different neck diameters need to be conveyed on the same conveyor. The spacing of the guides supporting the neck ring must then be changed, which it is desirable to do automatically, usually via the use of remotely controlled pistons, solenoids, or the like. While it is fairly straightforward to move straight and parallel guide sections in and out to adjust the distance between them, doing the same in curved sections is not as simple as it is not only the guide's position that must change, but also its shape. Indeed, if the distance between two curved guides is to be constant along their length, these guides need to be concentric. In other words, they must both be curved about a common centre of curvature, and each one's radius of curvature must be proportional to its distance from this point.

Prior art devices have addressed the above drawbacks by providing for a curved neck guide fabricated from a pair of slightly flexible curved segments, each segment attached to a pair of pistons rods. The piston rods move the segment outwards or inwards thereby causing a corresponding increase or decrease in the radius of curvature. In order to compensate for the increase or decrease in the radius of curvature, each segment is flexed slightly due to small differences in the length of travel of the piston rods. The problem of gaps which arise between adjacent segments due to an increase in curvature has been addressed in such prior art devices by inserting, using an additional actuating piston, a very small curve segment into the gap.

One drawback of the above prior-art devices is that they move only between two positions and therefore provide only for a small number of different guideway widths.

One challenge is therefore to move a curved guide section toward or away from its centre of curvature while at the same time adjusting its radius of curvature so that the guide's centre of curvature remains stationary. This guarantees that parallelism is maintained between the two curved guide sections that support the bottles, thereby preventing the bottles from either jamming or escaping the guideway at any point along the curve.

SUMMARY OF THE INVENTION

In order to address the above and other limitations and drawbacks, a curved guide assembly is disclosed. The assembly comprises first and second plates movable relative to one another, and a plurality of curve segments movably mounted to the first plate and to the second plate with gaps being provided between adjacent segments, each of the segments comprising a guide edge, the guide edges defining a curve having a radius of curvature. When the first and second plates are moved relative to one another, the segments are moved thereby changing the radius of curvature, the gaps between the segments remaining substantially constant.

In a particular embodiment the plurality of curve segments are movably mounted to the first plate by a first series of at least two pin and slot assemblies and to the second plate by a second series of at least one pin and slot assemblies.

There is also disclosed a curved guideway assembly for a conveyor. The assembly comprises a pair of curved guides having substantially the same curve centre and defining substantially the same curve, the guides defining the guideway there between. At least one of the guides is an adjustable guide comprising first and second plates movable relative to one another, and a plurality of curve segments movably mounted to the first plate and to the second plate with gaps being provided between adjacent segments, each of the segments comprising a guide edge, the guide edges defining a curve having a radius of curvature. When the first and second plates are moved relative to one another the segments are moved thereby changing the radius of curvature, the gaps between the segments remaining substantially constant.

Furthermore, there is disclosed a curved guideway assembly for use in an air conveyor for conveying articles having a variable width neck portion and suspended in the guideway by a flange immediately above the neck portion, The assembly comprises a pair of curved guides having substantially the same curve centre and defining a guideway width there between. At least one of the guides is an adjustable guide, the guides movable towards or away from one another such that the guideway width is adjustable between a first width, a second width and at least one intermediate width. In operation, the guideway width is adjusted such that the neck portion of the article being conveyed may move freely therein while remaining retained within the guideway by the flange.

In a particular embodiment the adjustable guides comprise first and second plates movable relative to one another, and a plurality of curve segments movably mounted to the first plate and to the second plate with gaps being provided between adjacent segments, each of the segments comprising a guide edge, the guide edges defining a curve having a radius of curvature. When the first and second plates are moved relative to one another, the segments are moved thereby changing the radius of curvature, the gaps between the segments remaining substantially constant.

In another particular embodiment the assembly further comprises a sensor for sensing the width of the neck portion of the articles being conveyed, at least one actuator for moving the first guide towards or away from the second guide between the first position, the second position and the intermediate positions, and a controller, the controller receiving the sensed width from the sensor and controlling the series of actuators such that the guideway width is adjusted to the predetermined width which is larger than and closest to the width of the neck portion.

Also, there is disclosed an air conveyor system for conveying articles having a variable width neck portion and suspended in the guideway by a flange immediately above the neck portion. The system comprises a source of air for conveying the articles and at least one curved section. The curved sections comprise first and second guides curved guides having substantially the same curve centre and defining a guideway there between. At least one of the guides is an adjustable guide comprising first and second plates movable relative to one another, and a plurality of curve segments movably mounted to the first plate and to the second plate with gaps being provided between adjacent segments, each of the segments comprising a guide edge, the guide edges defining a curve having a radius of curvature. When the first and second plates are moved relative to one another the segments are moved thereby changing the radius of curvature, the gaps between the segments remaining substantially constant.

In a particular embodiment the system further comprises a sensor for sensing the width of the articles being conveyed, at least one actuator for moving the adjustable guides towards or away from the second guide between a first position, a second position and at least one intermediate positions, and a controller, the controller receiving the sensed width from the sensor and controlling the series of actuators such that a width of the guideway is adjusted to a predetermined width which is larger than and closest to the width of the articles being conveyed.

Additionally, there is disclosed a method for realising a curved guide having an adjustable radius of curvature. The method comprises the steps of dividing the guide into a plurality of segments each comprising a guide edge, and shifting each of the segments along a path such that a gap between the segments remains substantially constant while simultaneously rotating the segments such that lines normal to the centre of each guide edge intersect at substantially the same point.

BRIEF DESCRIPTION OF THE FIGURES

FIG. 2 is a lowered perspective view of a curve section in accordance with an illustrative embodiment of the present invention;

FIG. 3A is an exploded lowered perspective view of a portion of a curve section in accordance with an illustrative embodiment of the present invention;

FIG. 3B is a top plan view of a portion of a curve section in accordance with an illustrative embodiment of the present invention with the segments fully retracted;

FIG. 4 is a top plan view of a segment in accordance of an illustrative embodiment of the present invention;

FIGS. 5 and 6A through 6C are top schematic views detailing the method for realising an adjustable curved guideway method in accordance with an illustrative embodiment of the present invention;

FIGS. 7A and 7B are top schematic views detailing the method for realising an adjustable curved guideway method in accordance with an alternative illustrative embodiment of the present invention;

FIG. 7D is a top plan view of a segment in accordance with an alternative illustrative embodiment of the present invention;

FIG. 8 is a top plan view of a segment in accordance with a second alternative illustrative embodiment of the present invention.

DETAILED DESCRIPTION OF THE ILLUSTRATIVE EMBODIMENTS

Figure 1:
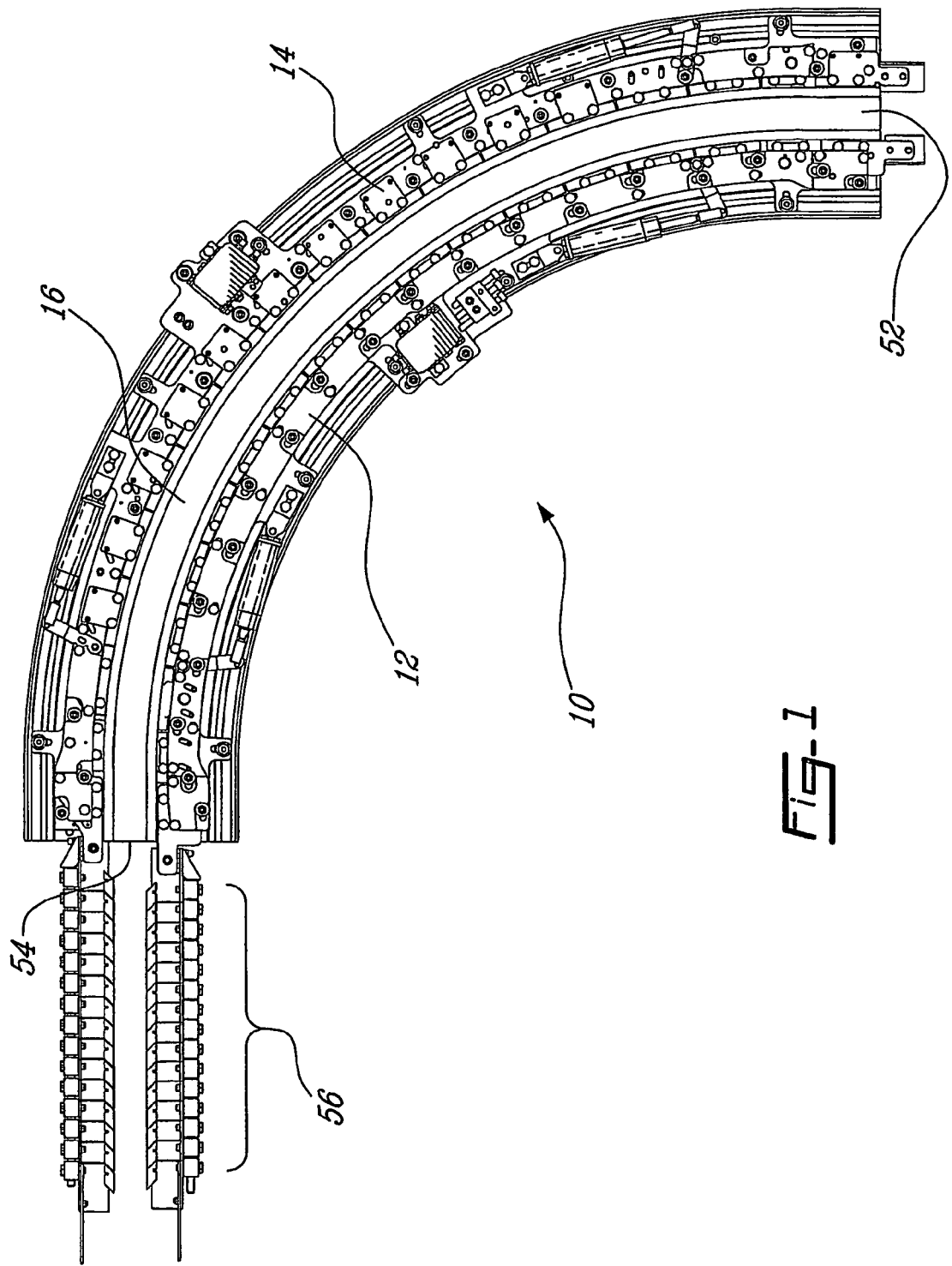
FIG. 1 is a bottom plan view of an adjustable curved conveyor guideway in accordance with an illustrative embodiment of the present invention.

Referring now to FIG. 1, an adjustable curved guideway, generally referred to using the reference numeral 10, will now be described. In general, the various components of the adjustable curve 10 are manufactured from a rigid material suited for bending, drilling and the like such as stainless steel plate, aluminum, titanium and the like, with the various components being assembled together using suitable fastening techniques such as nut and bolts assemblies, welding or other bonding techniques.

Still referring to FIG. 1, the curve 10 is comprised of inner curve section 12 and an outer curve section 14 which oppose one another and define a guideway 16 in between. Referring to FIG. 2, the inner curve section 12 (as well as the outer curve section 14) is comprised of a series of abutting segments as in 18 sandwiched between a first plate 20 and a second plate, 22. Illustratively, the first plate 20 is held securely by a supporting framework (not shown) and remains immoveable vis-à-vis the conveyor system in which the adjustable curve 10 has been integrated and is referred to hereinbelow as the fixed plate 20. Similarly, the second plate 22 is movable along the fixed plate 20 in a manner which will be described in more detail hereinbelow and is referred to hereinbelow as the movable plate 22. In order to move the movable plate 22 vis-à-vis the fixed plate 20, a pair of actuating assemblies as in 24, for example pneumatic pistons, are provided for.

Note that it is not necessary that one of the plates 20, 22 remain fixed, and in a given embodiment either of the plates 20, 22 could be fixed, or they could both be movable, with provision of a requisite support structure and with suitable modifications to the adjustable curved guideway 10 as disclosed herein.

Referring now to FIG. 3A, the segments as in 18 are each comprised of a guide 26 fastened to a retaining plate 28 by means of a suitable fastener such as a pair of bolts as in 30. Forward edges 32 of the guides 26 are typically slightly curved (with the radius of curvature of the forward edges 32 being selected to lie between the minimum and maximum radius of curvature of the curve section 12, 14), although this may in some cases prove unnecessary, for example when a large number of segments as in 18 are used to manufacture the curve section as in 12 or 14.

Each segment further comprises a pair of raised pins or cylindrical abutments as in 34 on each surface thereof. The pins 34 could be, for example, steel dowels or the like which are fastened in a pair of holes (not shown) drilled or otherwise machined towards the rearward edge of the retaining plate 28. The pins as in 34 project above both the upper and lower surfaces of the retaining plate 28. A first series of slots or grooves as in 36 are machined in the fixed plate 20. Likewise, a second series of slots or grooves as in 38 are machined in the movable plate 22. Note that although in the present illustrative embodiment the slots bisect the plate within which they machined, with suitable modifications grooves which do not bisect the plate could also be used.

As will be seen below, each pin and slot assembly is comprised of a pin as in 34 inserted into a slot as in 36, 38, which act as guides for the same. Both the first series of slots 36 and the second series of slots are such that a pin as in 34 fits snugly therein while being free to move along the slots 36, 38. Note that in an alternative embodiment the slots as in 36, 38 could be machined in the segments and the pins 34 mounted to the plates 20, 22. Additionally, in other alternative embodiments combinations of the above could also be used.

Referring now to FIG. 4, on assembly the pins as in 34 are inserted into both the first series of slots 36 in the fixed plate 20 and the second series of slots 38 in the movable plate 22. Additionally, a set of protective collars 40, manufactured for example from a self lubricating material such as UHMW polymer or the like, are placed around the pins 34 to reduce friction between the pins 34 and the inside surfaces of the slots as in 36, 38 as well as to hold the pins 34 centred in the slots 36, 38. The slots as in 36, 38 serve to retain the segments 18 arranged between the fixed plate 20 and the movable plate 22.

Figure 3C:
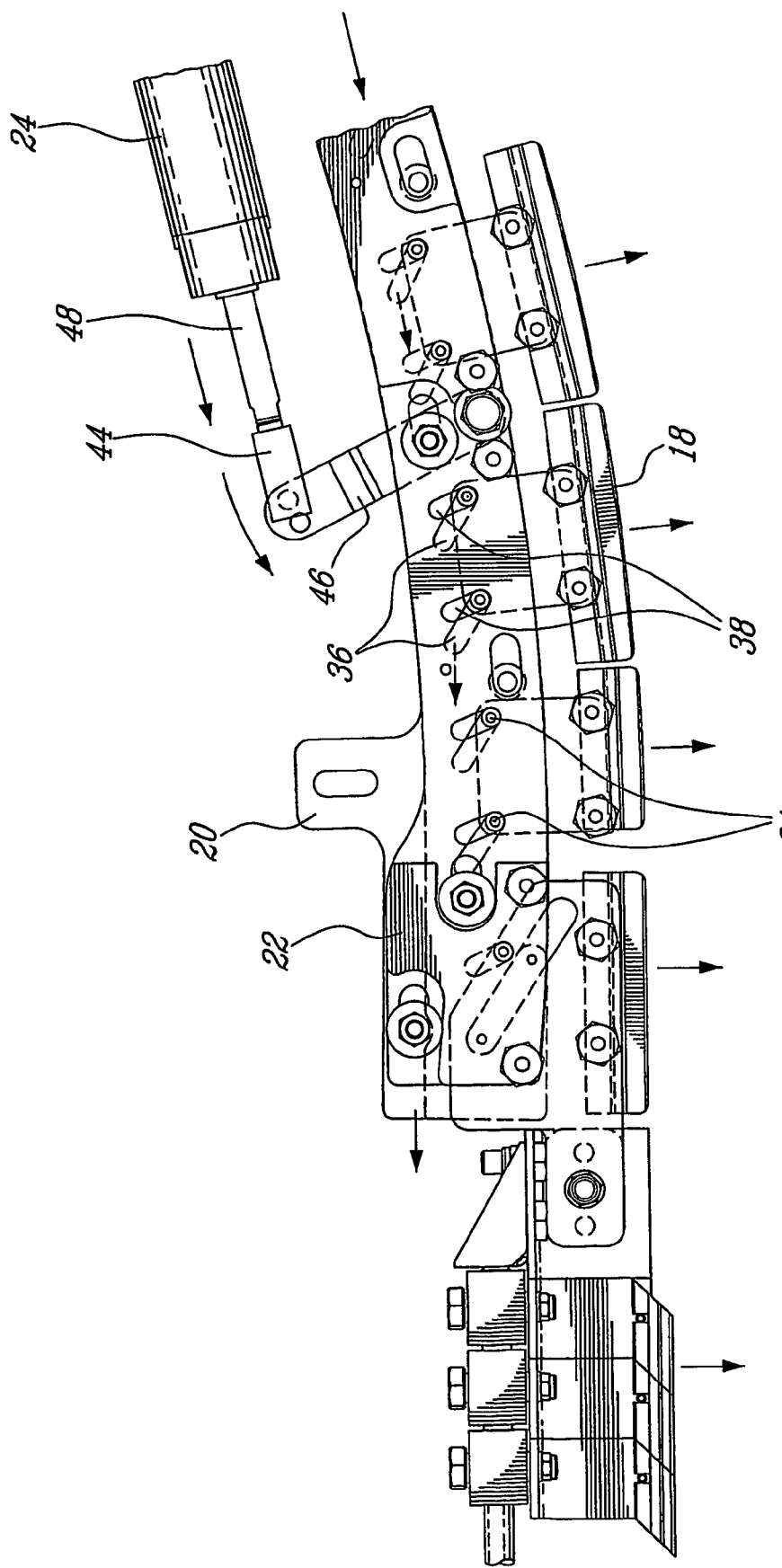
FIG. 3C is a second top plan view of the portion of the curve section of FIG. 3B with the segments fully extended.

Referring now to FIGS. 3A, 3B and 3C, the actuating assemblies as in 24 are attached at a first end 42 to the fixed plate 20 and at a second end 44 to the mobile plate 22 via a levering assembly 46. Referring to FIG. 3C, when the actuating assembly 24 is actuated, a piston rod 48 moves relative to the fixed plate 20, applying force to the levering assembly 46 which in turn causes the movable plate 22 to be moved relative to the fixed plate 20. Referring now to FIG. 4 in addition to FIGS. 3B and 3C, moving the movable plate 22 relative to the fixed plate 20 causes the point of intersection of the series of slots 36 with the series of slots 38 to move. This in turn causes a force to be applied to the pins 34 which causes the segments as in 18 to move. Precision machining and matching of intersecting slots allows for the segments as in 18 not only to be moved perpendicular relative to the guideway, but also allows the segments as in 18 to be rotated to some degree.

As stated above, attempting to fabricate a curve from segments which can provide for increases or decreases in guideway width by moving in and out radially vis-à-vis the centre of the curve gives rise to gaps being formed between adjacent segments as the radius increases of the curve. As will be apparent to a person of ordinary skill in the art, this is due to the length of an arc increasing with an increase in radius, while the total length of the segments making up the curve remains constant. Although a guide presenting gaps may in some cases be sufficient, a guide presenting a continuous surface is preferable in curved sections as this is where articles travelling in the conveyor are most firmly pressed against the guides due to the change in direction of the article in the curve. In such a setting, the presence of excessively large gaps between the segments making up the curve could lead to fouling in the conveyor or even damage the articles being conveyed.

By accurate placement of the slots 36, 38 within which the pins 34 of each segment as in 18 forming the curves 12, 18 travel, the segments as in 18, and therefore the forward edges 32 which define the curves, can be made to follow a path which is not radial, but rather oriented in such a way that the forward edges 32 of adjacent segments 18 remain contiguous with their neighbours while at the same time, the forward edges 32 are oriented towards the curve's centre of curvature.

In order to describe the manner in which the above principles have been translated into the current illustrative embodiment of an assembly for simultaneously moving individual segments forming a curve, a series of simplified schematic diagrams in FIGS. 5 through 10 will be referred to.

Figure 5:
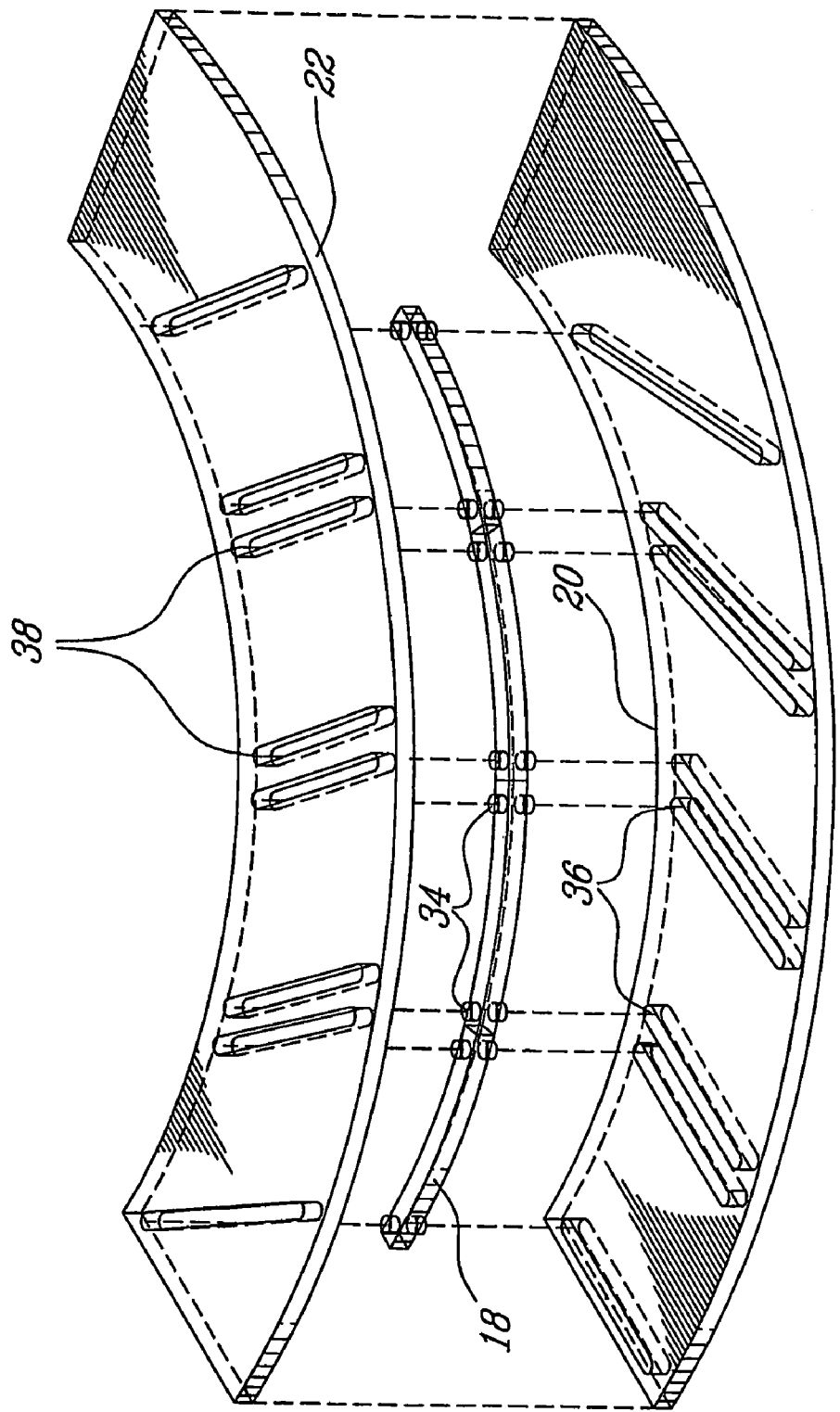

Referring now to FIG. 5, as stated above, the assembly is comprised of a series of segments as in 18 sandwiched between a fixed plate 20 and a movable plate 22. Each segment 18 is comprised of a pair of pins 34 which project beyond the surfaces of the segment 18. The portion of the pin 34 which projects towards the fixed plate 20 intersects with a slot as in 36 machined in the fixed plate 20. Similarly, the portion of the pin 34 which projects towards the movable plate 22 intersects with a slot as in 38 machined in the movable plate 22. Each of the slots 36, 38 is straight and therefore the path followed by a given pin is also straight. However, in order to provide for rotation of the segments as they move, the pair of slots 36, 38 followed by the pair of pins 34 on a given segment, and therefore the paths followed by those pins, are not parallel.

Still referring to FIG. 5, when the pins 34 of each segment as in 18 are engaged in slots 36, 38 as described above, it becomes necessary to move all segments as in 18 simultaneously to ensure that at any moment, they are always all equidistant from the curve's centre of curvature. Additionally, some segments rotate very little as they move, and the slots that the pins as in 34 follow are nearly parallel. It will be apparent to a person of ordinary skill in the art that parts constrained in this way are prone to jamming when care is not taken to accurately synchronize the travel of all pins 34 within their respective slots 36, 38.

Also, it must be noted that if the curve's first segment (bottom right) follows a nearly radial path, the farther along the curve from the first segment, the more the paths followed by the other segments deviate from a purely radial path, and the more pronounced the required rotation becomes to keep the segments aligned with the desired curved shape.

To move all these segments as in 18 in unison, the movable plate 22 is superimposed on the fixed plate 20 to yield the structure of FIG. 6. As discussed above, the movable plate 22 is free to slide relative to the fixed plate 20, but it is constrained so that it can only rotate about the two plates' common centre of curvature.

Figure 6B:
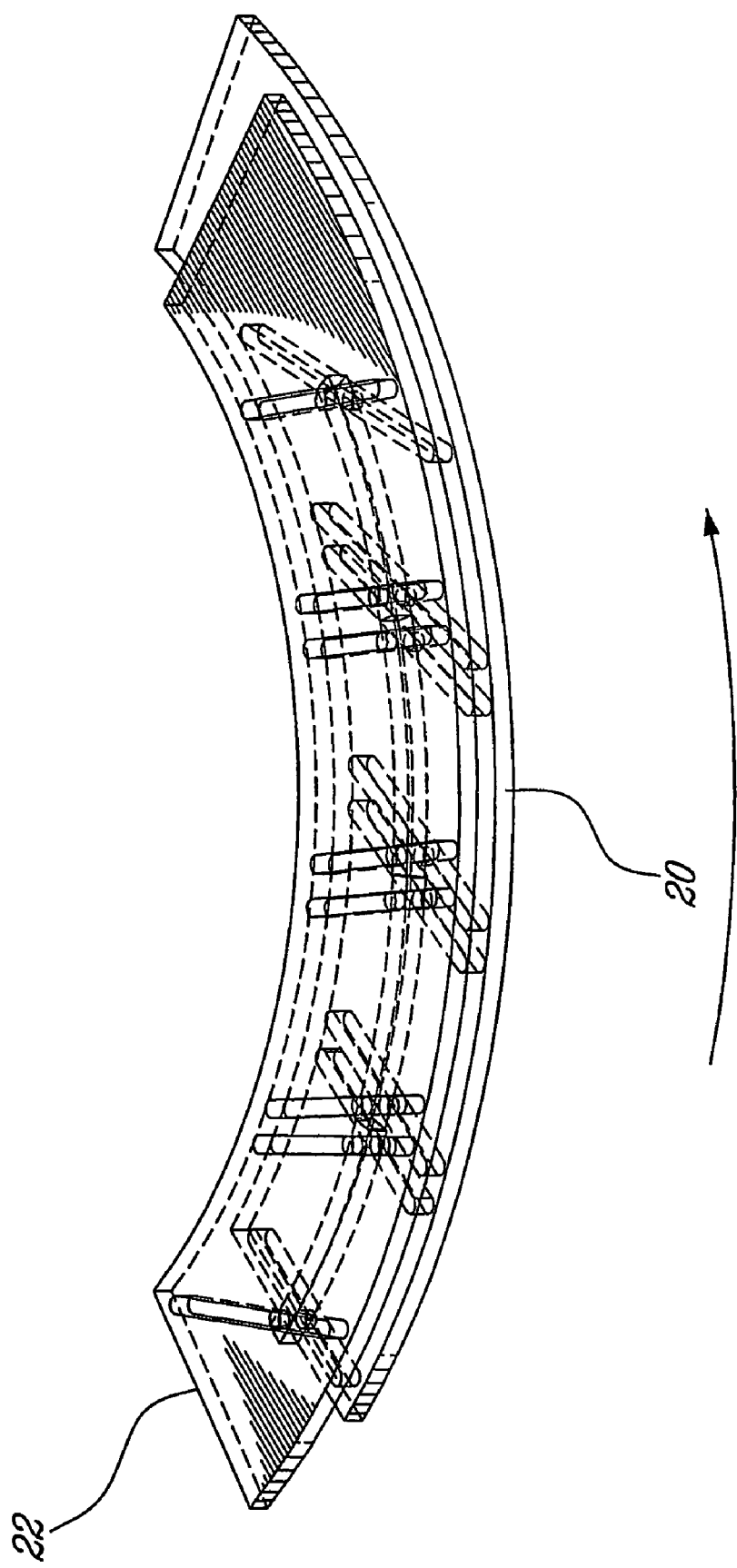
Figure 6C:
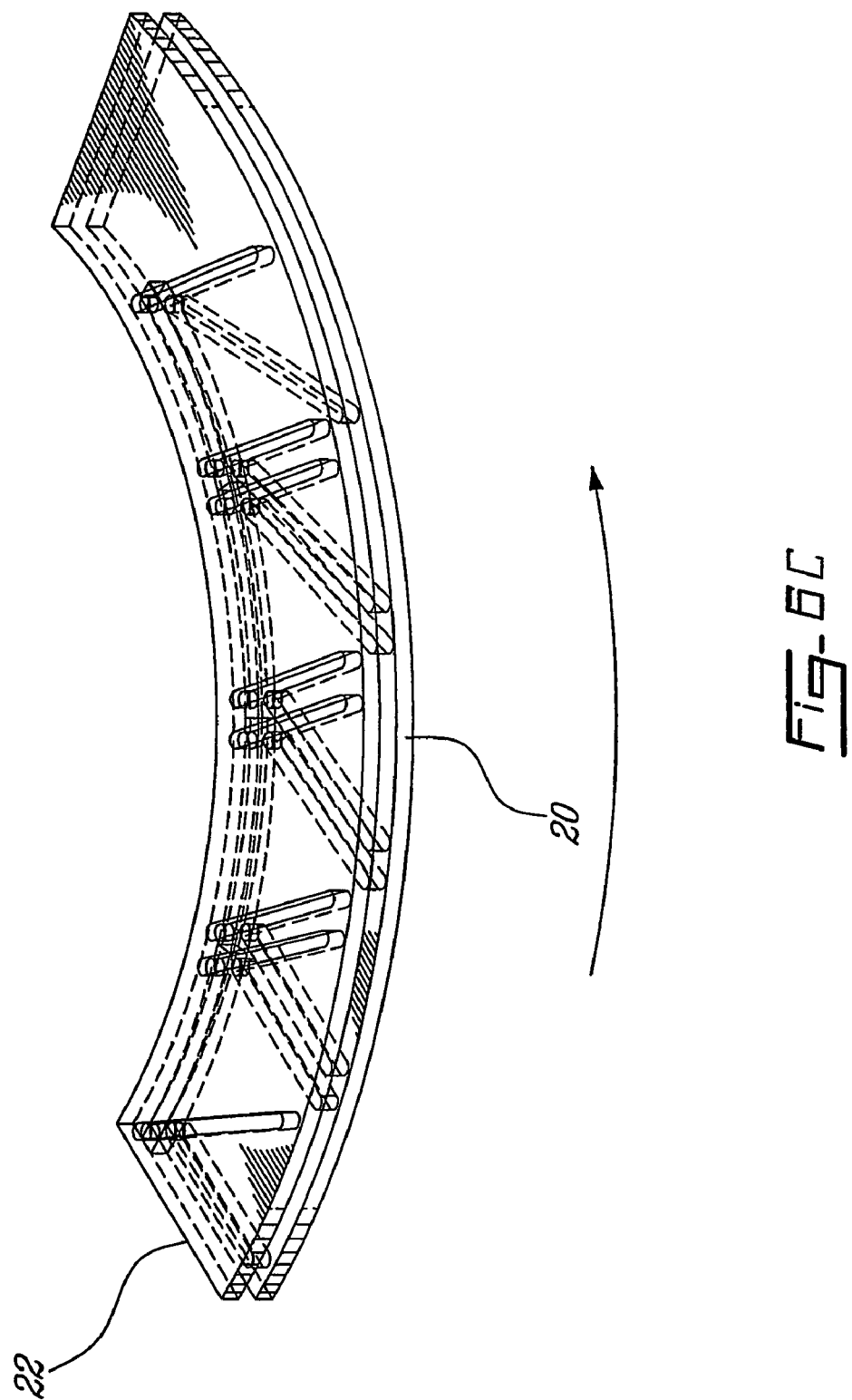

When the fixed plate 20 and movable plate 22 are superimposed, each slot 36 of the fixed plate 20 crosses a corresponding slot 38 in the movable plate 22. It will be apparent now to one of ordinary skill in the art that as the movable plate 22 is rotated relative to one fixed plate 20 about the common centre of curvature, the point of intersection of the slots will move inwards or outwards, depending on the direction of rotation and the respective angles of the slots 36, 38. Therefore, by engaging the ends of a pin 34 attached towards the end of a curved segment 18 in both slots 36, 38 at the same time, the end of the curved segment 18 can also be moved. FIG. 6A shows the plates 20, 22 in a relative position that maximizes the curve's radius. FIG. 6B shows the same plates 20, 22 in an intermediate position, and FIG. 6C shows the same plates 20, 22 in a minimum-radius position.

Figure 7A:
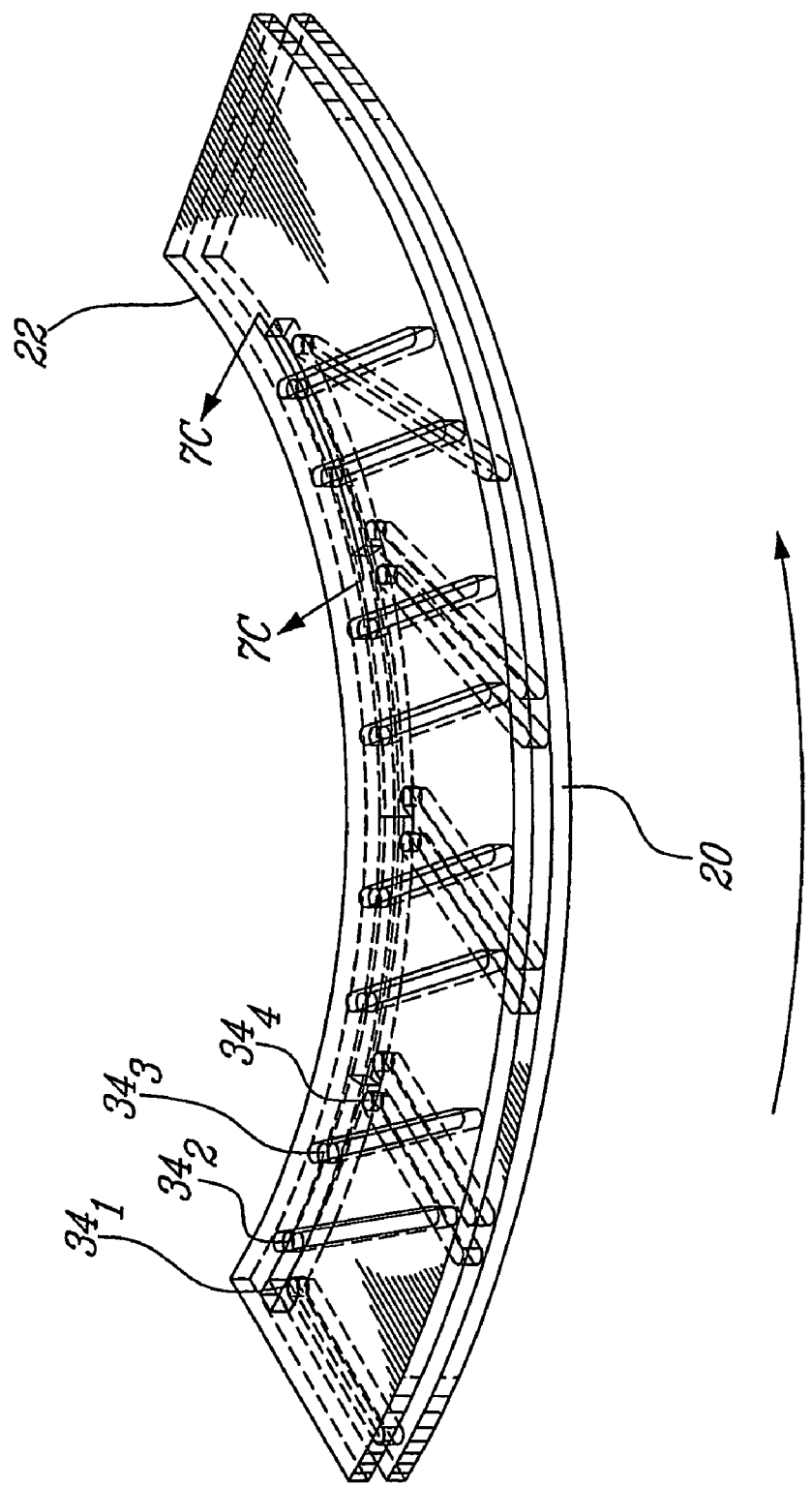
Figure 7C:
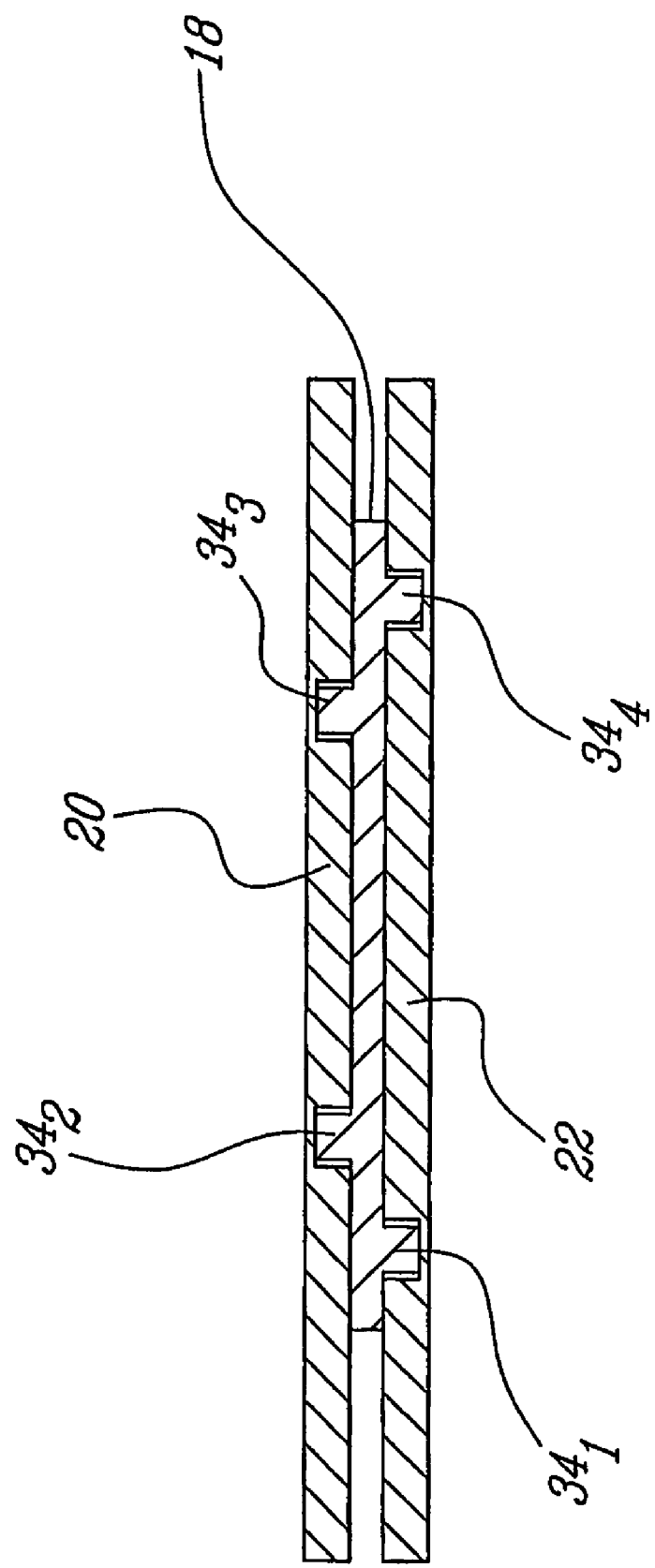
FIG. 7C is a side cutaway view along 7C in FIG. 7A in accordance with an alternative illustrative embodiment of the present invention.

It should be noted that the text and illustrations above describe only one of a number of possible implementations of this invention. In this regard, while convenient, it is not absolutely necessary that the pins 34 on the segments be engaged in the slots 36, 38 where the paths in the two plates 20, 22 intersect. It is possible to assemble the mechanism with the segments mounted between a top and a bottom plate, and to space apart the engagement points in the two plates 20, 22 as illustrated in FIG. 7A (minimum curve radius) and FIG. 7B (maximum curve radius). Referring to FIGS. 7C and 7D, as will now be apparent to a person of ordinary skill in the art the pins $34_1$, $34_2$, $34_3$, and $34_4$ are positioned so that pins on opposite sides of the segments 18 they do not share a common axis.

Similarly, referring to FIG. 8, in a second alternative embodiment, the number of pins as in 34 attached to a first side of the segment 18 (and thus the number of slots 36, 38 in either the fixed plate 20 or the movable plate 22) can be reduced to one, while two remain on the second side of the segment 18.

Also, as an alternative illustrative embodiment which is within the scope of the present invention, the slots as in 36, 38 could be machined in the segment 18 and the pins placed in the plates 20, 22. Additionally, combinations of the above could also be used.

Similarly, it must be noted that the arrangement described, consisting of segments sandwiched between a top and a bottom plate is only one of several possibilities. For example, the two plates could very well be superimposed, with the segments forming a third layer. It would then be necessary to devise a way to maintain the segments against the second layer formed by one of the plates, possibly using a third plate as a fourth layer with which the segments would be in slidable contact.

Referring back to FIG. 1, in order to ensure a smooth surface to the guide in contact with the article being conveyed, and to further improve the smoothness or the arc, a flexible moulded channel 50, fabricated from an appropriate low friction material such as plastic or UHMW polymer, can be placed over the forward edges 32 of the segments as in 18 which define the curve.

Figure 9:
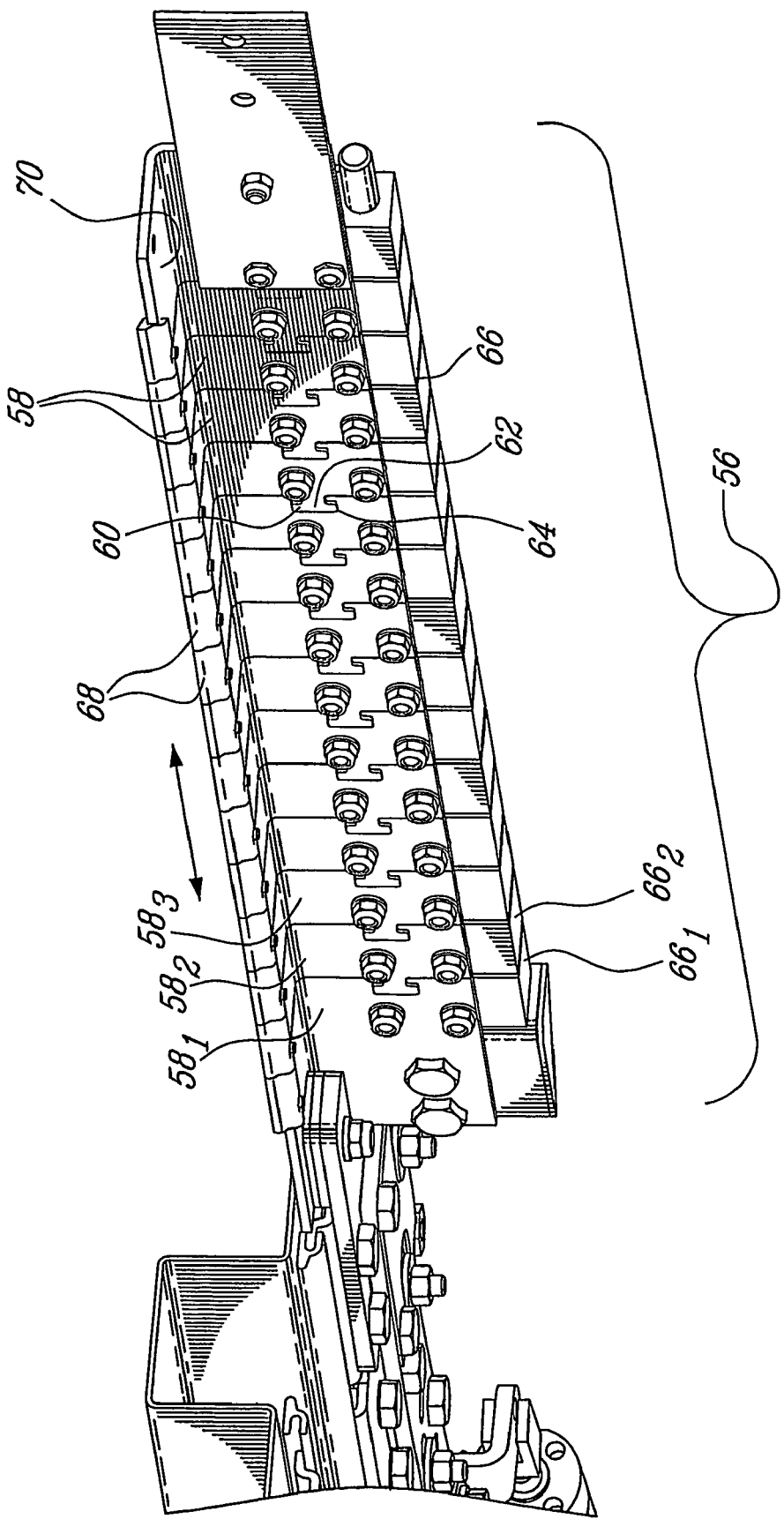
FIG. 9 is a perspective view of a segmented straight guide section in accordance with an alternative illustrative embodiment of the present invention.

Still referring to FIG. 1, as the radius of the curve moves from its smallest radius to its greatest radius, maintaining a substantially gapless curve will mean that a gap will be introduced at one or both the ends 52, 54 of the curve. In order to accommodate this gap, a segmented straight guide section 56 can be attached at one or both the curve ends 52, 54. Referring now to FIG. 9, the individual straight segments 58 of the segmented straight guide section 56 are simply linked together using a linking mechanism 60 (in the disclosed illustrative embodiment, comprised of a tongue 62 inserted into a socket 64, the tongue 62 able to move slightly back and forth within the socket 64) such that when the gap $66_1$ between the first and second straight segments $58_1$, $58_2$ reaches its maximum, the gap $66_2$ between the second and third straight segments $58_2$, $58_3$ begins to open, and so on. In this manner, what would otherwise be a large gap at the end of the curve is translated into a series of smaller gaps in the straight section which are narrow enough not to disturb the flow of articles along the conveyor. Similar to the curved guide section, flexible moulded channel 68 could be placed over the guide edges 70 of the straight segments as in 58 to lessen the effect the gaps 66 may have on the flow of articles along the guideway.

Note that, instead of obtaining no gap at one end of the curve and a wide one at the other end as the radius increases, it is also possible to have a narrower gap at both ends, which can be closed using the segmented straight guide section 56 as disclosed in FIG. 9.

Referring now back to FIG. 2, travel of the second plate 22 versus the first plate 20 is limited using an adjustable stop assembly 72. The stop assembly is comprised of a series of adjusting screws 74 one of which butts against a movable stop (not shown). By moving the stop in front of a given adjusting screw 74, the movement of the second plate 22 versus the first plate 20 due to the movement of the piston rod 48 and the levering assembly 46 can be limited to one of a number of predetermined values, these values being predetermined by the adjusting screws 74. In an illustrative embodiment the movable stop is moved using compressed air.

Other embodiments of the present invention are also possible, for example, the method could be used to design a guide where small gaps between segments are introduced (for example, to lessen the size of the gaps which form toward the ends of the curve). Additionally, the method could be used to design a guide where any gap which is introduced between segments is not equal for all segments.

The above disclosed assemblies are suitable for remote control using a controller (not shown), for example a microcontroller or the like. In particular, a microcontroller can be used which controls the feed of compressed air to the actuating assemblies 10 (see FIG. 1) as well as to the stop assembly 72 (FIG. 2). Additionally, in a particular implementation the controller could be combined with a sensor (also not shown) for sensing the widths of articles to be conveyed, in particular the width of the necks of bottles about to enter the guideway, and adjust the width of the guideway accordingly.

Although the present invention has been described hereinabove by way of a preferred embodiment thereof, this embodiment can be modified at will without departing from the spirit and nature of the subject invention.

What is claimed is:

1. A curved guide assembly, the assembly comprising:
   first and second plates movable relative to one another; and
   a plurality of curve segments, mounted to said first plate and to said second plate with gaps being provided between adjacent segments, each of said segments comprising a guide edge, said guide edges defining a curve having a radius of curvature;
   wherein when said first and second plates are moved relative to one another, said segments are moved thereby changing said radius of curvature, said gaps between said segments remaining substantially constant, said plurality of curve segments being movably mounted to said first plate by a first series of at least two pin and slot assemblies and to said second plate by a second series of at least one pin and slot assemblies, said pins comprising a self lubricating collar.

2. The assembly of claim 1, wherein said adjacent segments are abutted.

3. The assembly of claim 1, wherein the curve has a curve centre and as said first and second plates are moved relative to one another, said segments are rotated such that lines normal to a centre of each guide edge intersect at said curve centre.

4. The assembly of claim 1, wherein said first plate is a fixed plate.

5. The assembly of claim 3, wherein said curve centre is a fixed point.

6. The assembly of claim 1, wherein said slots of said first series of pin and slot assemblies are in said first plate and said pins are attached to said segment.

7. The assembly of claim 1, wherein said slots of said second series of pin and slot assemblies are in said second plate and said pins are attached to said segment.

8. The assembly of claim 1, wherein said slots of said first series of pin and slot assemblies are in said first plate, said slots of said second series of pin and slot assemblies are in said second plate and said pins are attached to said segment.

9. The assembly of claim 8, wherein said pins are dowels mounted in holes in said segments.

10. The assembly of claim 1, wherein said collar is fabricated from UHMW polymer.

11. The assembly of claim 1, wherein each of said segments are mounted to said first plate by two pin and slot assemblies and to said second plate by two pin and slot assemblies.

12. The assembly of claim 11, wherein said slots of said first series of pin and slot assemblies are in said first plate, said slots of said second series of pin and slot assemblies are in said second plate and said pins are attached to said segments.

13. The assembly of claim 12, wherein said pins are dowels mounted through holes in said segments.

14. The assembly of claim 1, wherein said segments are in between said first plate and said second plate.

15. The assembly of claim 1, further comprising an actuating assembly for moving said first plate relative to said second plate.

16. The assembly of claim 15, wherein said actuating assembly is comprised of at least one piston.

17. The assembly of claim 16, wherein said pistons are pneumatic.

18. The assembly of claim 1, wherein said second plate is movable with respect to said first plate along a curved path.

19. The assembly of claim 1, wherein said second plate is movable with respect to said first plate between a first position wherein said guide edges define a curve having a first radius, a second position wherein said guide edges define a curve having a second radius, and at least one intermediate position wherein said guide edges define a curve having a radius in between said first radius and said second radius.

20. The assembly of claim 19, wherein said first radius, said second radius and said intermediate radii are predetermined.

21. The assembly of claim 19, wherein each of said guide edges is curved with a curve having a radius in between said first radius and said second radius.

22. The assembly of claim 21, wherein said guide edge curve has a radius halfway in between said first radius and said second radius.

23. The assembly of claim 1, wherein the curve defined by the assembly is substantially 90 degrees.

24. The assembly of claim 1, wherein said curved guide is a neck guide.

25. A curved guideway assembly for a conveyor, the assembly comprising:
    a pair of curved guides having substantially the same curve centre and defining substantially the same curve, said guides defining the guideway there between;
    wherein at least one of said guides is an adjustable guide comprising:
        first and second plates movable relative to one another; and
        a plurality of curve segments movably mounted to said first plate and to said second plate with gaps being provided between adjacent segments, each of said segments comprising a guide edge, said guide edges defining a curve having a radius of curvature;
        wherein when said first and second plates are moved relative to one another said segments are moved thereby changing said radius of curvature, said gaps between said segments remaining substantially constant, said plurality of curve segments being movably mounted to said first plate by a first series of at least two pin and slot assemblies and to said second plate by a second series of at least one pin and slot assemblies, said pins comprising a self lubricating collar.

26. The assembly of claim 25, wherein both said curved guides are adjustable guides.

27. The assembly of claim 25, wherein for each of said adjustable guides said second plate is movable with respect to said first plate between a first position wherein said guide edges define a curve having a first radius, a second position wherein said guide edges define a curve having a second radius, and at least one intermediate position wherein said guide edges define a curve having a radius in between said first radius and said second radius.

28. The assembly of claim 25, wherein said curved guides are neck guides.

29. The assembly of claim 25, wherein said first radius, said second radius and said intermediate radii are predetermined.

30. The assembly of claim 25, wherein as said first and second plates of each of said adjustable guides are moved relative to one another, said segments are rotated such that lines normal to a centre of each guide edge intersect at said curve centre.

31. The assembly of claim 25, wherein for each of said adjustable guides said plurality of curve segments are movably mounted to said first plate by a first series of at least two pin and slot assemblies and to said second plate by a second series of at least one pin and slot assemblies.

32. The assembly of claim 25, wherein for each of said adjustable guides said first plates are fixed plates.

33. The assembly of claim 25, wherein said curve centre is a fixed point.

34. A curved guideway assembly for use in an air conveyor for conveying articles having a variable width neck portion and suspended in said guideway by a flange immediately above said neck portion, the assembly comprising:
    a pair of curved guides having substantially the same curve centre and defining a guideway width there between;
    wherein at least one of said guides is an adjustable guide, said guides movable towards or away from one another such that said guideway width is adjustable between a first width, a second width and at least one intermediate width;
    wherein each of said adjustable guides comprise:
        first and second plates movable relative to one another; and
        a plurality of curve segments movably mounted to said first plate and to said second plate with gaps being provided between adjacent segments, each of said segments comprising a guide edge, said guide edges defining a curve having a radius of curvature, said plurality of curve segments being movably mounted to said first plate by a first series of at least two pin and slot assemblies and to said second plate by a second series of at least one pin and slot assemblies, said pins comprising a self lubricating collar;
    wherein when said first and second plates are moved relative to one another, said segments are moved thereby changing said radius of curvature, said gaps between said segments remaining substantially constant; and
    wherein, in operation, said guideway width is adjusted such that the neck portion of the article being conveyed may move freely therein while remaining retained within the guideway by the flange.

35. The assembly of claim 34, wherein said first width, said second width and said intermediate widths are predetermined widths.

36. The assembly of claim 34, wherein said adjacent segments are abutted.

37. The assembly of claim 34, wherein as said first and second plates are moved relative to one another, said segments are rotated such that lines normal to a centre of each guide edge intersect at said curve centre.

38. The assembly of claim 34, wherein said plurality of curve segments are movably mounted to said first plate by a first series of at least two pin and slot assemblies and to said second plate by a second series of at least one pin and slot assemblies.

39. The assembly of claim 34, further comprising a sensor for sensing the width of the neck portion of the articles being conveyed and wherein said guideway width is adjusted to the predetermined width which is larger than and closest to the width of the neck portion.

40. The assembly of claim 34, further comprising at least one actuator attached between said first and second plates for moving said first plate relative to said second plate.

41. The assembly of claim 40, wherein said actuators are pistons.

42. The assembly of claim 41, wherein said pistons are pneumatic.

43. The assembly of claim 34, further comprising:
a sensor for sensing the width of the neck portion of the articles being conveyed;
at least one actuator for moving said first guide towards or away from said second guide between said first position, said second position and said intermediate positions; and
a controller, said controller receiving said sensed width from said sensor and controlling said series of actuators such that said guideway width is adjusted to the predetermined width which is larger than and closest to the width of the neck portion.

44. The assembly of claim 34, wherein both of said guides are adjustable guides.

45. The assembly of claim 44, wherein said guides are independently adjustable.

46. An air conveyor system for conveying articles having a variable width neck portion and suspended in said guideway by a flange immediately above said neck portion, the system comprising:
a source of air for conveying the articles; and
at least one curved section, said curved sections comprising:
first and second guides curved guides having substantially the same curve centre and defining a guideway there between;
wherein at least one of said guides is an adjustable guide comprising:
first and second plates movable relative to one another; and
a plurality of curve-segments movably mounted to said first plate and to said second plate with gaps being provided between adjacent segments, each of said segments comprising a guide edge, said guide edges defining a curve having a radius of curvature;
wherein when said first and second plates are moved relative to one another said segments are moved thereby changing said radius of curvature, said gaps between said segments remaining substantially constant, said plurality of curve segments being movably mounted to said first plate by a first series of at least two pin and slot assemblies and to said second plate by a second series of at least one pin and slot assemblies, said pins comprising a self lubricating collar.

47. The system of claim 46 further comprising:
a sensor for sensing the width of the articles being conveyed;
at least one actuator for moving said adjustable guides towards or away from said second guide between a first position, a second position and at least one intermediate positions; and
a controller, said controller receiving said sensed width from said sensor and controlling said series of actuators such that a width of said guideway is adjusted to a predetermined width which is larger than and closest to the width of the articles being conveyed.

48. A method for realising a curved guide having an adjustable radius of curvature, the method comprising the steps of:
dividing the guide into a plurality of segments each comprising a guide edge; and
shifting each of said segments along a path such that a gap between said segments remains substantially constant while simultaneously rotating said segments such that lines normal to the centre of each guide edge intersect at substantially the same point;
wherein each of said segments is movably mounted to a first plate and to a second plate with gaps being provided between adjacent segments, said guide edges defining a curve having a radius of curvature, and wherein said shifting step comprises moving said first plate relative to said second plate thereby moving said segments and changing said radius of curvature, said gaps between said segments remaining substantially constant, said plurality of segments being movably mounted to said first plate by a first series of at least two pin and slot assemblies and to said second plate by a second series of at least one pin and slot assemblies, said pins comprising a self lubricating collar.

49. The method of claim 48, wherein said intersection point is fixed.

50. The method of claim 48, wherein each of said segments is movably mounted to a first plate by at least two pin and slot assemblies and each of said segments are movably mounted to a second plate by at least one pin and slot assembly.

51. The method of claim 50, wherein each of said segments are movably mounted said second plate by at least two pin and slot assemblies.

* * * * *